*(12)* United States Patent
Dreps et al.

(10) Patent No.: US 7,710,144 B2
(45) Date of Patent: May 4, 2010

(54) CONTROLLING FOR VARIABLE IMPEDANCE AND VOLTAGE IN A MEMORY SYSTEM

(75) Inventors: Daniel M. Dreps, Georgetown, TX (US); David J. Chen, Endwell, NY (US); William F. Lawson, Vestal, NY (US); David W. Mann, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,804

(22) Filed: Jul. 1, 2008

(65) Prior Publication Data

US 2010/0001758 A1    Jan. 7, 2010

(51) Int. Cl.
*H03K 17/16* (2006.01)
*G06F 17/50* (2006.01)

(52) U.S. Cl. .................................. 326/30; 365/189.11
(58) Field of Classification Search .................. 326/30, 326/86; 365/189.05, 189.11
See application file for complete search history.

(56) References Cited

U.S. PATENT DOCUMENTS 6,762,620 B2 * 7/2004 Jang et al. .................... 326/30
6,836,143 B2 * 12/2004 Song .......................... 326/30
6,839,286 B2 * 1/2005 Cho et al. .............. 365/189.05
7,417,452 B1 * 8/2008 Wang et al. .................... 326/30
7,420,386 B2 * 9/2008 Wang et al. .................... 326/30
7,514,954 B2 * 4/2009 Kim et al. ..................... 326/30
7,525,357 B2 * 4/2009 Kuzmenka .................. 327/172
7,557,603 B2 * 7/2009 Pan ............................. 326/30

* cited by examiner

*Primary Examiner*—Vibol Tan
(74) *Attorney, Agent, or Firm*—Cantor Colburn LLP; Robert R. Williams

(57) ABSTRACT

A memory interface device, system, method, and design structure for controlling for variable impedance and voltage in a memory system are provided. The memory interface device includes a calibration cell configurable to adjust an output impedance relative to an external reference resistor, and driver circuitry including multiple positive drive circuits and multiple negative drive circuits coupled to a driver output in a memory system. The memory interface device further includes impedance control logic to adjust the output impedance of the calibration cell and selectively enable the positive and negative drive circuits as a function of a drive voltage and a target impedance.

17 Claims, 7 Drawing Sheets

CONTROLLING FOR VARIABLE IMPEDANCE AND VOLTAGE IN A MEMORY SYSTEM

BACKGROUND

This invention relates generally to computer memory systems, and more particularly to controlling for variable impedance and voltage in a memory system.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

Typical memory buffers used to interface with DRAM devices have a core voltage rail and additional rails to supply memory device voltage and other functions. With each generation of memory device technology, the memory device voltage rail has been reduced to correspond with increased memory device frequencies.

SUMMARY

An exemplary embodiment is a memory interface device that includes a calibration cell configurable to adjust an output impedance relative to an external reference resistor, and driver circuitry including multiple positive drive circuits and multiple negative drive circuits coupled to a driver output in a memory system. The memory interface device further includes impedance control logic to adjust the output impedance of the calibration cell and selectively enable the positive and negative drive circuits as a function of a drive voltage and a target impedance.

Another exemplary embodiment is a system that includes one or more memory devices and a memory interface device in communication with the one or more memory devices via a physical interface. The physical interface includes a calibration cell configurable to adjust an output impedance relative to an external reference resistor, and driver circuitry comprising multiple positive drive circuits and multiple negative drive circuits coupled to a driver output in the system. The physical interface further includes impedance control logic to adjust the output impedance of the calibration cell and selectively enable the positive and negative drive circuits as a function of a drive voltage and a target impedance.

A further exemplary embodiment is a method for controlling for variable impedance and voltage in a memory system. The method includes determining a target output impedance as a function of a drive voltage and interconnections to a driver output in the memory system. The method further includes adjusting an output impedance relative to an external reference resistor, and calculating a combination of positive and negative drive circuits to enable as a function of the drive voltage and the target impedance. The method additionally includes enabling the combination of positive and negative drive circuits coupled to the driver output in response to the calculating.

An additional exemplary embodiment is a design structure tangibly embodied in a machine-readable medium for designing, manufacturing, or testing an integrated circuit. The design structure includes a calibration cell configurable to adjust an output impedance relative to an external reference resistor, and driver circuitry including multiple positive drive circuits and multiple negative drive circuits coupled to a driver output in a memory system. The design structure also includes impedance control logic to adjust the output impedance of the calibration cell and selectively enable the positive and negative drive circuits as a function of a drive voltage and a target impedance.

Other systems, methods, apparatuses, design structures and/or computer program products according to embodiments will be or become apparent to one with skill in the art upon review of the following drawings and detailed description. It is intended that all such additional systems, methods, apparatuses, design structures and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

The invention as described herein controls a memory interface for variable impedance and voltage in a memory system. As multiple generations of double-data-rate (DDR) synchronous dynamic random access memory (SDRAM) devices have been developed, each generation has different power supply requirements. For example, the power supply requirements for various generations of DDR SDRAM are: 1.8 Volts for DDR2, 1.5 Volts for DDR3, 1.35 Volts for DDR3+, and 1.2 Volts for DDR4. A memory interface device that controls access to memory devices is constrained in size and power, particularly when integrated onto a dual inline memory module (DIMM) along with memory devices. Memory devices use a variety of signal types to read and write data, with different optimal impedances. In an exemplary embodiment, a memory interface device includes circuitry configured to support multiple memory device input/output (I/O) voltages as well as multiple impedances without modifying an external calibration resistor. The memory interface device can be implemented in a memory hub device or memory controller with multiple ports that are configurable to interface directly with one or more ranks of memory devices and registers of industry-standard registered dual in-line memory modules (RDIMMs). Interposing a memory hub device as a memory interface device between a memory controller and memory devices enables a flexible high-speed protocol with error detection to be implemented. Additional features are described in greater detail herein.

Figure 1:
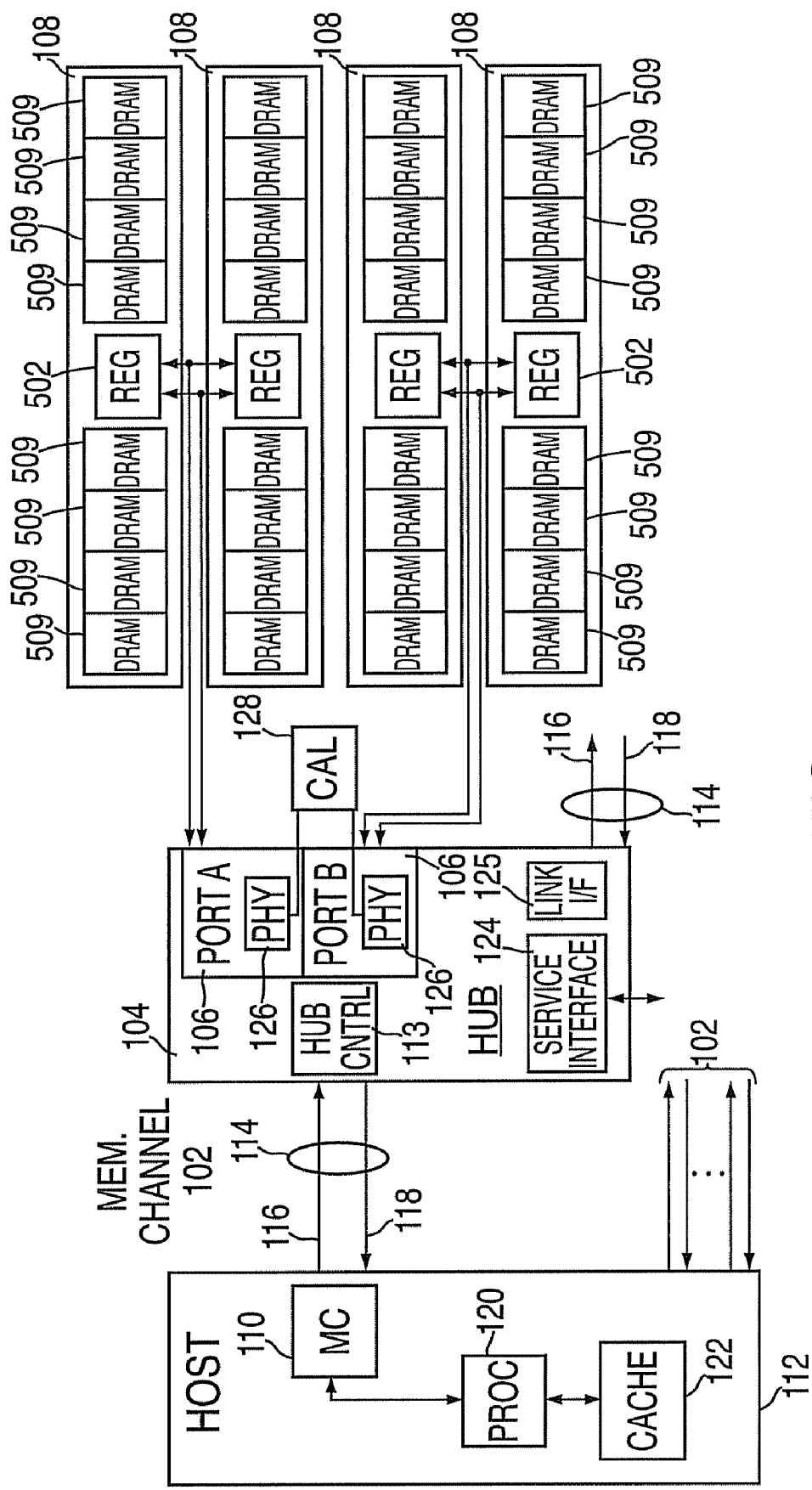
FIG. 1 depicts a memory system interfacing with multiple registered dual in-line memory modules (RDIMMs) communicating via high-speed upstream and downstream links that may be implemented by exemplary embodiments.

Turning now to FIG. 1, an example of a memory system 100 that includes one or more host memory channels 102 each connected to one or more cascaded memory hub devices 104 is depicted in a planar configuration. Each memory hub device 104 may include two synchronous dynamic random access memory (SDRAM) ports (port A and port B) 106 connected to zero, one or two industry-standard RDIMMs 108. For example, the RDIMMs 108 can utilize multiple memory devices 509, such as a version of double data rate (DDR) dynamic random access memory (DRAM), e.g., DDR1, DDR2, DDR3, DDR4, etc. In an exemplary embodiment, the memory devices 509 are DDR3 synchronous DRAMs that interface to ports A and B 106 via register/phase locked loop (PLL) devices 502 to locally control address and control signal timing on the RDIMMs 108. The memory channel 102 carries information to and from a memory controller 110 in host processing system 112. The memory channel 102 may transfer data at rates upwards of 6.4 Gigabits per second. The hub control logic 113 in the memory hub device 104 can translate the information from a high-speed reduced pin count bus 114 which enables communication to and from the memory controller 110 of the host processing system 112 to lower speed, wide, bidirectional ports 106 to support low-cost industry standard memory, thus the memory hub device 104 and the memory controller 110 are both generically referred to as communication interface devices or memory interface devices. The bus 114 includes downstream link segments 116 and upstream link segments 118 as unidirectional links between devices in communication over the bus 114. The term "downstream" indicates that the data is moving from the host processing system 112 to the memory devices of the RDIMMs 108. The term "upstream" refers to data moving from the memory devices of the RDIMMs 108 to the host processing system 112. The information stream coming from the host processing system 112 can include of a mixture of commands and data to be stored in the RDIMMs 108 and redundancy information, which allows for reliable transfers. The information returning to the host processing system 112 can include data retrieved from the memory devices on the RDIMMs 108, as well as redundant information for reliable transfers. Commands and data can be initiated in the host processing system 112 using processing elements known in the art, such as one or more processors 120 and cache memory 122. The memory hub device 104 can also include additional communication interfaces, for instance, a service interface 124 to initiate special test modes of operation that may assist in configuring and testing the memory hub device 104.

In an exemplary embodiment, the memory controller 110 has a very wide, high bandwidth connection to one or more processing cores of the processor 120 and cache memory 122. This enables the memory controller 110 to monitor both actual and predicted future data requests to the memory channel 102. Based on the current and predicted processor 120 and cache memory 122 activity, the memory controller 110 determines a sequence of commands to best utilize the attached memory resources to service the demands of the processor 120 and cache memory 122. This stream of commands is mixed together with data that is written to the memory devices of the RDIMMs 108 in units called "frames". The memory hub device 104 interprets the frames as formatted by the memory controller 110 and translates the contents of the frames into a format compatible with the RDIMMs 108.

Although only a single memory channel 102 is depicted in detail in FIG. 1 connecting the memory controller 110 to a single memory device hub 104, systems produced with this configuration may include more than one discrete memory channel 102 from the memory controller 110, with each of the memory channels 102 operated singly (when a single channel is populated with modules) or in parallel (when two or more channels are populated with modules) to achieve the desired system functionality and/or performance. Moreover, any number of lanes can be included in the bus 114, where a lane includes link segments that can span multiple cascaded memory hub devices 104. For example, the downstream link segments 116 can include 13 bit lanes, 2 spare lanes and a clock lane, while the upstream link segments 118 may include 20 bit lanes, 2 spare lanes and a clock lane. To reduce susceptibility to noise and other coupling interference, low-voltage differential-ended signaling may be used for all bit lanes of the bus 114, including one or more differential-ended clocks. Both the memory controller 110 and the memory hub device 104 contain numerous features designed to manage the redundant resources, which can be invoked in the event of hardware failures. For example, multiple spare lanes of the bus 114 can be used to replace one or more failed data or clock lane in the upstream and downstream directions.

In one embodiment, one of the spares can be used to replace either a data or clock link, while a second spare is used to repair a data link but not a clock link. This maximizes the ability to survive multiple interconnect hard failures. Additionally, one or more of the spare lanes can be used to test for transient failures or establish bit error rates. The spare lanes are tested and aligned during initialization but are deactivated during normal run-time operation. The channel frame format, error detection and protocols are the same before and after spare lane invocation. A link interface 125 can be used to manage lane selection and flow of information on the bus 114.

In order to allow larger memory configurations than could be achieved with the pins available on a single memory hub device 104, the memory channel protocol implemented in the memory system 100 allows for the memory hub devices to be cascaded together. Memory hub device 104 contains buffer elements in the downstream and upstream directions so that the flow of data can be averaged and optimized across the high-speed memory channel 102 to the host processing system 112.

Memory hub devices 104 include support for the separate out-of-band service interface 124, as depicted in FIG. 1, which can be used for advanced diagnostic and testing purposes. For example, the service interface 124 can be used to configure memory interface parameters in physical interfaces (PHYs) 126 of ports A and B 106. The PHYs 126 provide voltage and establish output impedances for a variety of interconnections with the RDIMMs 108 and the memory devices 509. Calibration resistors 128 can be used in establishing output impedances that the PHYs 126 may further adjust to optimize for different types of interconnections.

Figure 2:
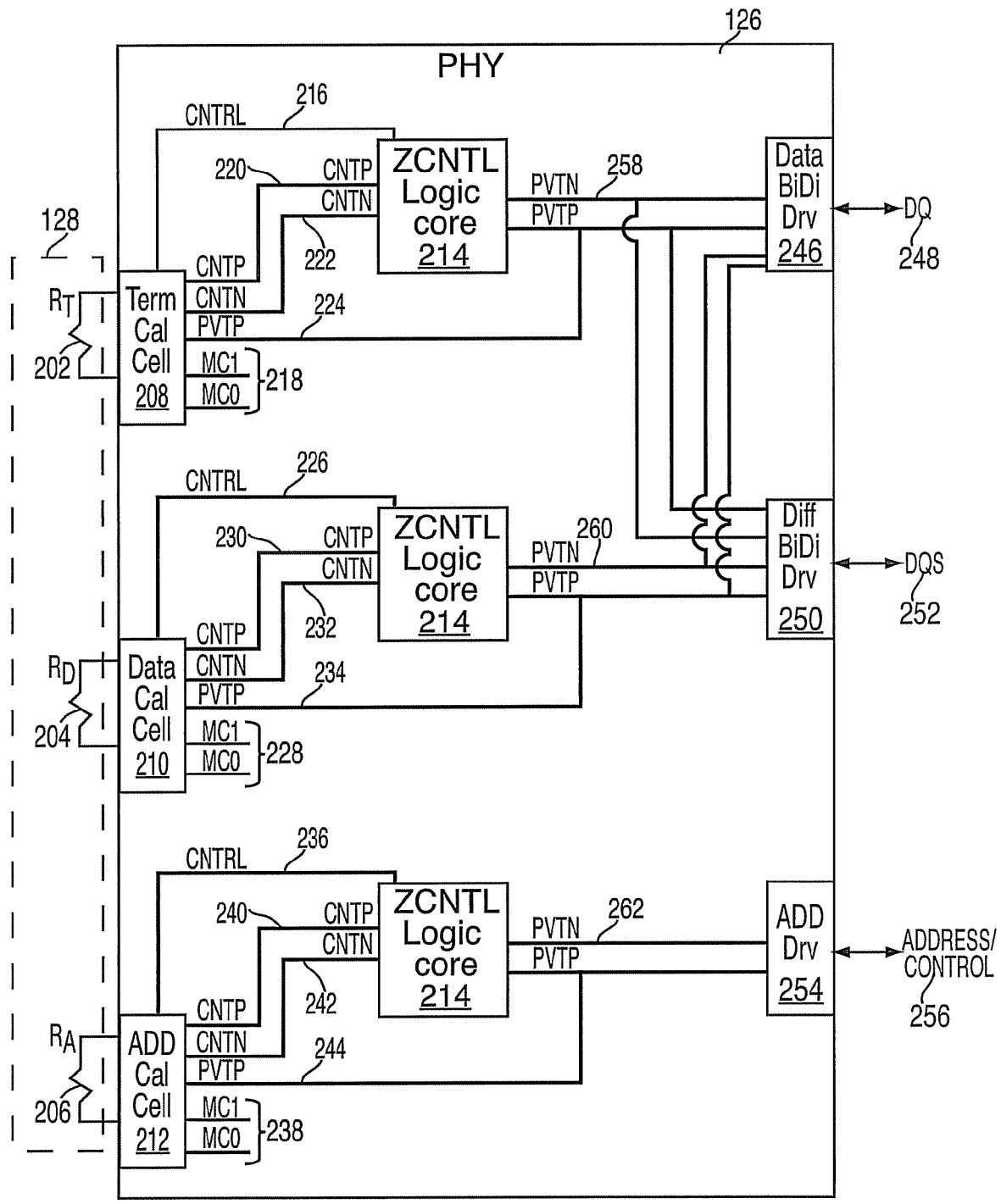
FIG. 2 depicts a physical interface for driving data, command, address, and termination for interfacing with memory devices or subsystems that may be implemented by exemplary embodiments.

FIG. 2 depicts an exemplary embodiment of one of the PHYs 126 of FIG. 1. The PHY 126 may be coupled to multiple calibration resistors 128, such as termination resistor (Rt) 202, data resistor (Rd) 204, and address resistor (Ra) 206. In an exemplary embodiment, Rt 202 is coupled to a termination calibration cell 208, Rd 204 is coupled to a data calibration cell 210, and Ra 206 is coupled to an address calibration cell 212. Each of the calibration cells 208-212 includes impedance adjustment circuitry controlled by instances of impedance control logic 214. Control lines 216, mode control lines 218, CNTP 220, CNTN 222, and PVTP 224 can be used to calibrate impedance in the termination calibration cell 208. Control lines 226, mode control lines 228, CNTP 230, CNTN 232, and PVTP 234 can be used to calibrate impedance in the data calibration cell 210. Similarly, control lines 236, mode control lines 238, CNTP 240, CNTN 242, and PVTP 244 can be used to calibrate impedance in the address calibration cell 212. The impedance control logic 214 blocks are also coupled to driver circuitry for interfacing with memory devices or registers. For example, data bidirectional driver 246 can drive or receive data on data lines (DQ) 248 as part of port A or B 106 of FIG. 1. Differential bidirectional driver 250 may be used to drive differential data strobes (DQS) 252 for timing read/write activity on DQ 248. Address driver 254 can be used to drive address and/or control lines 256. There may be multiple interconnections between the data bidirectional driver 214, such as PVTP 224 and PVTN 258. Similarly, PVTP 234 and PVTN 260 can be coupled to differential bidirectional driver 250, and PVTP 244 and PVTN 262 can be coupled to address driver 254. Additional connections that are not depicted can also exist between the elements in PHY 126, as well as connections to other elements of the ports 106 and in the memory hub device 104 of FIG. 1.

Figure 3:
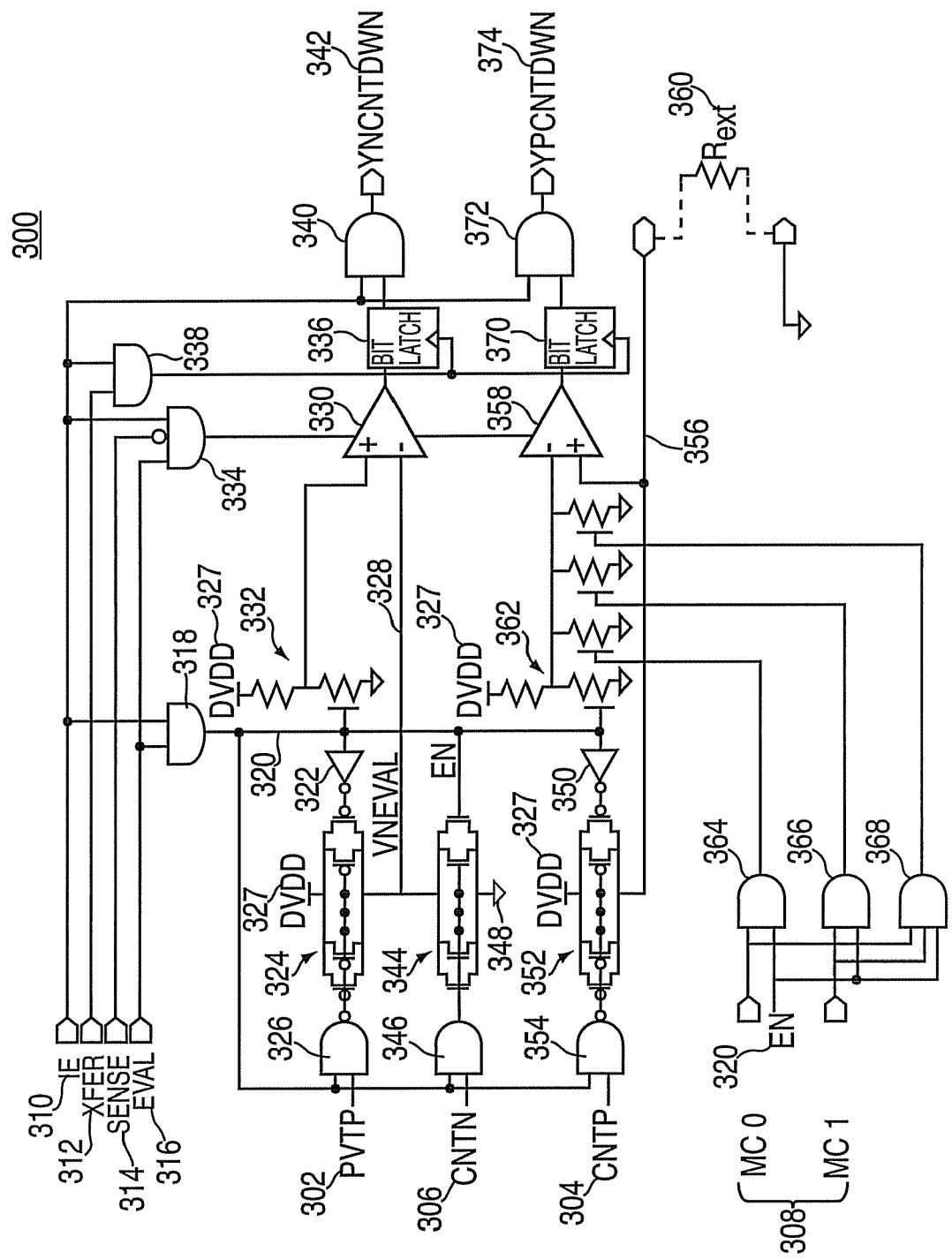
FIG. 3 depicts an example of an impedance calibration cell that may be implemented by exemplary embodiments.

FIG. 3 depicts an embodiment of a calibration cell 300 that may be used for the termination calibration cell 208, the data calibration cell 210, or the address calibration cell 212. The calibration cell 300 receives a variety of inputs, such as PVTP 302, CNTP 304, CNTN 306, mode controls (MC0 and MC1) 308, impedance adjustment enable (IE) 310, transfer strobe (XFER) 312, sense input (SENSE) 314, and evaluation (EVAL) 316. PVTP 302 may be a vector that includes multiple signals, e.g., 6 signals, for controlling/enabling positive drive voltage for a driver output. For example, PVTP 302 can represent PVTP 224, 234 and/or 244 of FIG. 2. CNTP 304 may be a vector that includes multiple signals, e.g., 6 signals, controlling counting for positive (P) signals as part of the impedance adjustment in the calibration cell 300. The CNTP 304 can represent CNTP 220, 230 and/or 240 of FIG. 2. Similarly, CNTN 306 may be a vector that includes multiple signals, e.g., 6 signals, controlling counting for negative (N) signals as part of the impedance adjustment in the calibration cell 300. The CNTN 306 can represent CNTN 222, 232 and/or 242 of FIG. 2. The mode controls 308 can represent mode control lines 218, 228, and/or 238 of FIG. 2.

In an exemplary embodiment, the IE 310 and the EVAL 316 are gated through an AND gate 318 to produce an enable (EN) 320. The EN 320 is input to an inverter 322, which is further coupled to a series of p-channel field effect transistors (P-FETs) 324, where the number of inputs in the vector of PVTP 302 may govern the number of P-FETs 324. The P-FETs 324 are also coupled to a NAND gate 326 that receives inputs from EN 320 and PVTP 302. Thus, individual transistors of the P-FETs 324 can be turned "on" allowing current flow between digital voltage source (DVDD) 327 and evaluation voltage (VNEVAL) 328 in response to EN 320 being asserted and associated values of the PVTP 302 being asserted. VNEVAL 328 provides a negative voltage reference to comparator 330, which is compared against voltage produced from voltage divider 332. The comparator 330 may be enabled as a function of IE 310, SENSE 314 and EVAL 316 via gate 334. The output of the comparator 330 can be latched in bit latch 336 in response to a clock or strobe resulting from a combination of IE 310 and XFER 312 via AND gate 338. A further AND gate 340 may be used to gate the bit latch 336 output with the IE 310 to output as a negative countdown value (YNCNTDWN) 342.

In an exemplary embodiment, EN 320 is also coupled to a series of n-channel field effect transistors (N-FETs) 344, which are further coupled to AND gate 346. The N-FETs 344 allow current flow between VNEVAL 328 and ground 348 when enabled. The AND gate 346 is coupled to the vector of CNTN 306 and EN 320. The EN 320 is further coupled to an inverter 350, which is further coupled to a series of P-FETs 352. The series of P-FETs 352 is also coupled to NAND gate 354, which responds to inputs of EN 320 and the vector of CNTP 304. When individual transistors in the series of P-FETs 352 are turned on, current can flow between DVDD 327 and node 356. Node 356 is coupled to a positive input (+) of comparator 358 and an external reference/calibration resistor (Rext) 360. Rext 360 can represent any of the resistors in the calibration resistors 128, such as Rt 202, Rd 204, and/or Ra 206 of FIG. 2. The comparator 358 receives a voltage reference on a negative input terminal (−) that is produced as a function of configurable settings in voltage divider 362 depending upon which resistors in the voltage divider 362 are enabled or disabled. The mode controls 308 can be gated via AND gates 364, 366 and 368 in combination with EN 320 to enable resistors in the voltage divider 362. Thus, the output state of the comparator 358 can change as a function of the mode controls 308, allowing impedance matching when monitoring the output of the comparator 358 as a feedback parameter of the selected mode controls 308. The output of the comparator 358 can be latched using bit latch 370 as strobed or clocked by gate 338. The output of the bit latch 370 may be further gated with respect to IE 310 using AND gate 372 to output positive countdown value (YPCNTDWN) 374. The countdown values 342 and 374 can be routed to impedance control logic 214 via control lines, such as control lines 216, 226 and/or 236 of FIG. 2.

In an exemplary embodiment, the mode control lines 218 are configurable to produce impedances of 30, 40, 60, or 120 Ohms with a 10% tolerance using the termination calibration cell 208. The mode control lines 228 can be configured to produce impedances of 25, 30, 35, or 40 Ohms with a 10% tolerance using the data calibration cell 210. The mode control lines 238 can be configured to produce impedances of 15, 20, 30, or 35 Ohms with a 10% tolerance using the address calibration cell 212. It will be understood that other values are possible, and that these values represent example embodiments.

Figure 4:
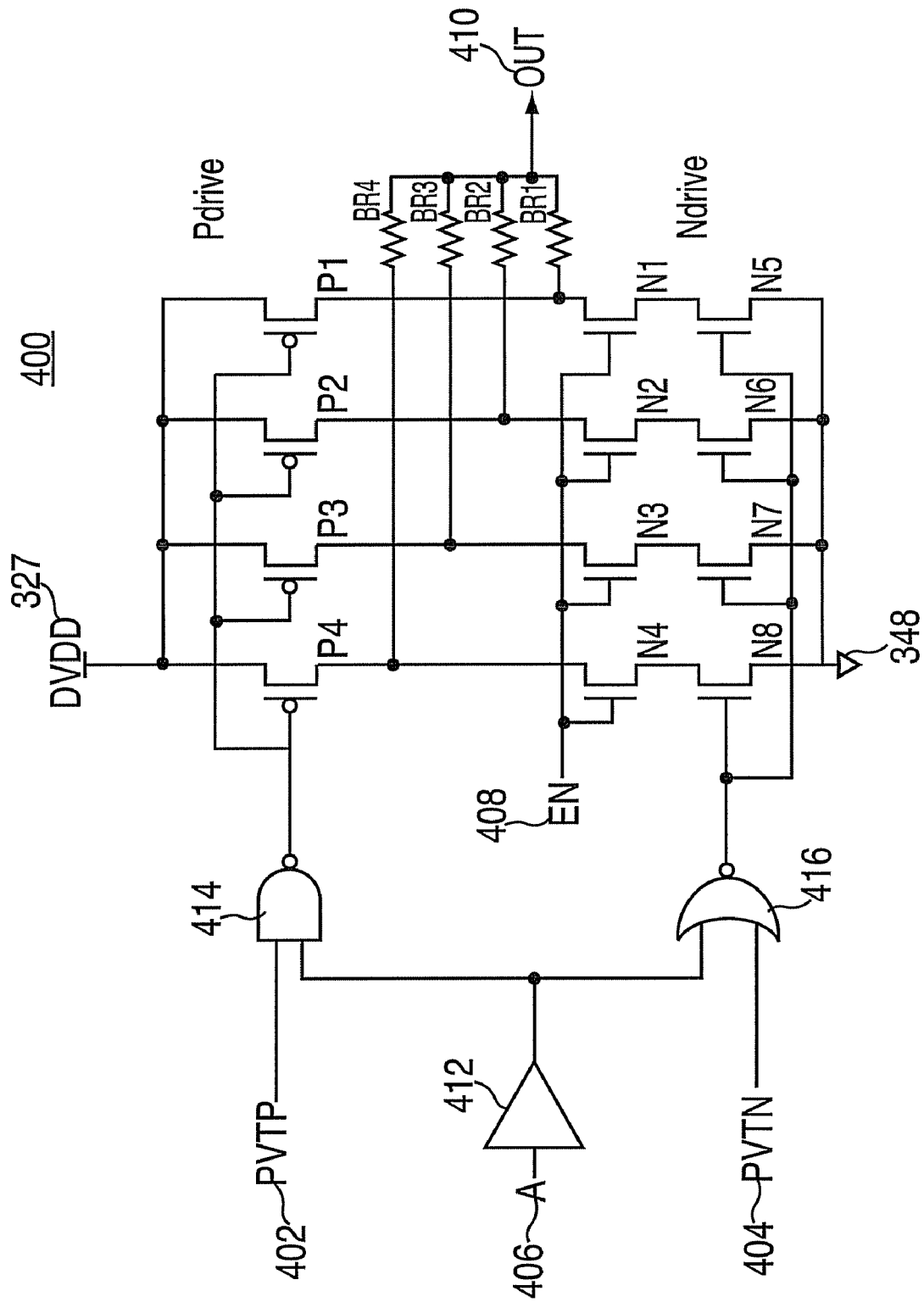
FIG. 4 depicts optimizing driver circuitry that may be implemented by exemplary embodiments.

FIG. 4 depicts optimizing driver circuitry 400 that may be implemented by exemplary embodiments. For example, the driver circuitry 400 can represent the data bidirectional driver 246, the differential bidirectional driver 250, and/or the address driver 254 of FIG. 2. In an exemplary embodiment, the driver circuitry 400 receives inputs of PVTP 402, PVTN 404, A 406, and enable (EN) 408. PVTP 402 may be a vector that includes multiple signals, e.g., 6 signals, controlling/ enabling positive drive voltage for driver output 410. For example, PVTP 402 can represent PVTP 224, 234 and/or 244 of FIG. 2. PVTN 404 may be a vector that includes multiple signals, e.g., 6 signals, controlling/enabling negative drive voltage for the driver output 410. For example, PVTN 404 can represent PVTN 258, 260 and/or 262 of FIG. 2. Input A 406 represents a state of an input to be driven on the driver output 410. For instance, the input A 406 can be a state of a data bit, an address bit, a control bit, or a strobe which may be determined based on communication received from the memory controller 110 of FIG. 1. Alternatively, state values for each input A 406 can be set by other resources in the memory hub device 104 of FIG. 1, to perform read, write, maintenance actions, and the like for devices in communication via the ports 106, e.g., RDIMMs 108 and/or specific memory devices 509.

The input A 406 can be single-ended or a differential signal. The input A 406 is buffered via buffer 412 and passed to gates 414 and 416. In an exemplary embodiment, gate 414 is a NAND gate that receives vector inputs of PVTP 402 and controls switching of P-FETs P1, P2, P3, and P4. The P-FETs P1-P4 may receive separate signals from the vector input, providing individually selectable enablement of each of the P-FETs P1-P4. The gate 416 may be a NOR gate that receives vector inputs of PVTN 404 and controls switching of N-FETs N5, N6, N7, and N8. The N-FETs N5-N8 can receive separate signals from the vector input, providing individually selectable enablement of each of the N-FETs N5-N8. EN 408 collectively switches N-FETs N1-N4 to enable or disable connectivity between the N-FETs N5-N8 and the driver output 410. Switching the P-FETs P1-P4 and N-FETs N1-N8 further modifies the output impedance to the driver output 410 and adjusts drive strength, where a combination of resistors BR1, BR2, BR3, and BR4 can be switched in between DVDD 327 or ground 348. DVDD 327 may support a variety of voltages, such as 1.5 Volts for DDR3, 1.35 Volts for DDR3+, and 1.2 Volts for DDR4. The P-FETs P1-P4 are also referred to as "Pdrive" and the N-FETs N1-N8 are referred to as "Ndrive". The FETs in the Pdrive and Ndrive can be stacked or arranged such that the gate oxide is thick enough to allow gate to source voltage (VGS) or drain to source voltage (VDS) that are lower than a reliability limit of the technology (Tox>Vmax). Using a gate oxide thickness of about 25 angstrom with a 120 nanometer channel may be sufficient to support a DVDD 327 of 1.5V +/- a tolerance (e.g., 10%). In an alternate embodiment, FETs using a channel of 9 to 12 nanometers employ a stacked design and to protect VDS and VGS that would otherwise be limited to about 1.2 V.

In an exemplary embodiment, when the driver circuitry 400 is combined with the calibration cell 300 of FIG. 3, the driver output impedance is Rext 360 divided by 4 plus the impedance offset adjustments. As the voltage of VDDR 327 is lowered, more of the N-FETs N5-N8 and/or P-FETs P1-P4 are enabled to compensate for the reduction in overdrive, which raises the effective impedance. The Ndrive and Pdrive are independently configurable as a function of vector values of PVTP 402 and PVTN 404.

The impedance control logic 214 of FIG. 2 may also provide multiple slew rate controls to adjust the rate of change on transitions of the output driver 410. In an exemplary embodiment, two slew rates are supported between 3 to 6 Volts/nanosecond. Slew rate adjustments can be determined as a function of the I/O voltage (DVDD 327) and the selected output impedance. For example, a faster slew rate can be achieved for a lightly loaded 35-Ohm impedance net as compared to a more heavily loaded 25-Ohm impedance net of multiple ranks of memory devices 509. Depending upon whether the memory hub device 104 of FIG. 1 is directly interfaced to memory devices 509, the number and type of memory devices 509, and/or a register device 502, the optimal output impedance for DQ 248, DQS 252 and address/control 256 of FIG. 2 can vary. The output driver 410 can also support a range of frequencies, such as 400 to 800 MHz, resulting in a data rate of 800 to 1600 Megabits per second.

There may be multiple instances of the driver circuitry 400 for each instance of the calibration cell 300 and the impedance control logic 214 of FIG. 2. For example, separate instances of the driver circuitry 400 can be used for each bit or physical connection for memory device or subsystem connections, while a single instance of the calibration cell 300 and the impedance control logic 214 can be used across a bus. Thus, if DQ 248 of FIG. 2 includes 72 lines, then 72 instances of the driver circuitry 400 can be connected to a single instance of the impedance control logic 214, the data calibration cell 210 and the termination calibration cell 208, where the termination calibration cell 208 provides read data termination. Similarly, if DQS 252 of FIG. 2 includes 18 differential lines, then 18 or 36 instances of the driver circuitry 400 can be connected to a single instance of the impedance control logic 214, the data calibration cell 210 and the termination calibration cell 208, where the termination calibration cell 208 provides read strobe termination. The data bidirectional driver 246 and the differential bidirectional driver 250 may both interface to the data calibration cell 210 and the termination calibration cell 208, with additional impedance adjustments made locally in the data bidirectional driver 246 for DQ 248 and in the differential bidirectional driver 250 for the DQS 252.

Figure 5:
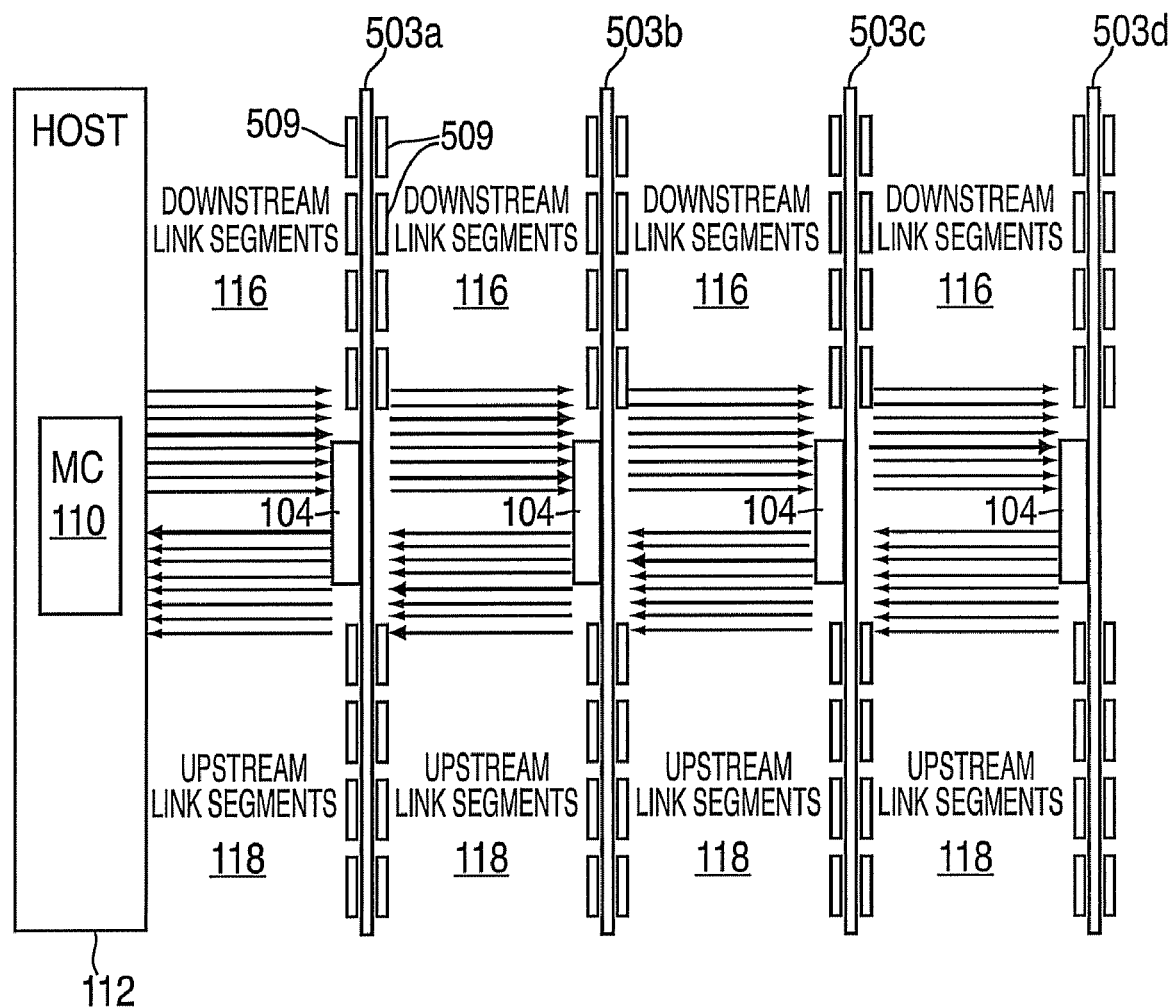
FIG. 5 depicts a cascade interconnected memory system that includes DIMMs communicating via high-speed upstream and downstream links that may be implemented by exemplary embodiments.

FIG. 5 depicts an exemplary embodiment where the memory hub devices 104 are integrated on DIMMs 503a, 503b, 503c, and 503d communicating via cascade interconnected downstream link segments 116 and upstream link segments 118. The DIMMs 503a-503d can include multiple memory devices 509, which may be DDR DRAM devices, as well as other components known in the art, e.g., resistors, capacitors, etc. The memory devices 509 are also referred to as DRAM 509 or DDRx 509, as any version of DDR may be included on the DIMMs 503a-503d, e.g., DDR2, DDR3, DDR4, etc. It can also be seen in FIG. 5 that the DIMM 503a, as well as DIMMs 503b-d may be dual sided, having memory devices 509 on both sides of the modules. Memory controller 110 in host 112 interfaces with DIMM 503a, sending commands, address and data values via the downstream link segments 116 and upstream link segments 118 that may target any of the DIMMs 503a-503d. If a DIMM receives a command that is not intended for it, the DIMM redrives the command to the next DIMM in the daisy chain (e.g., DIMM 503a redrives to DIMM 503b, DIMM 503b redrives to DIMM 503c, etc.). The memory devices 509 may be organized as one or more ranks on the DIMMs 503a-503d, e.g., stacked memory devices 509 or multiple rows per DIMM.

Figure 6:
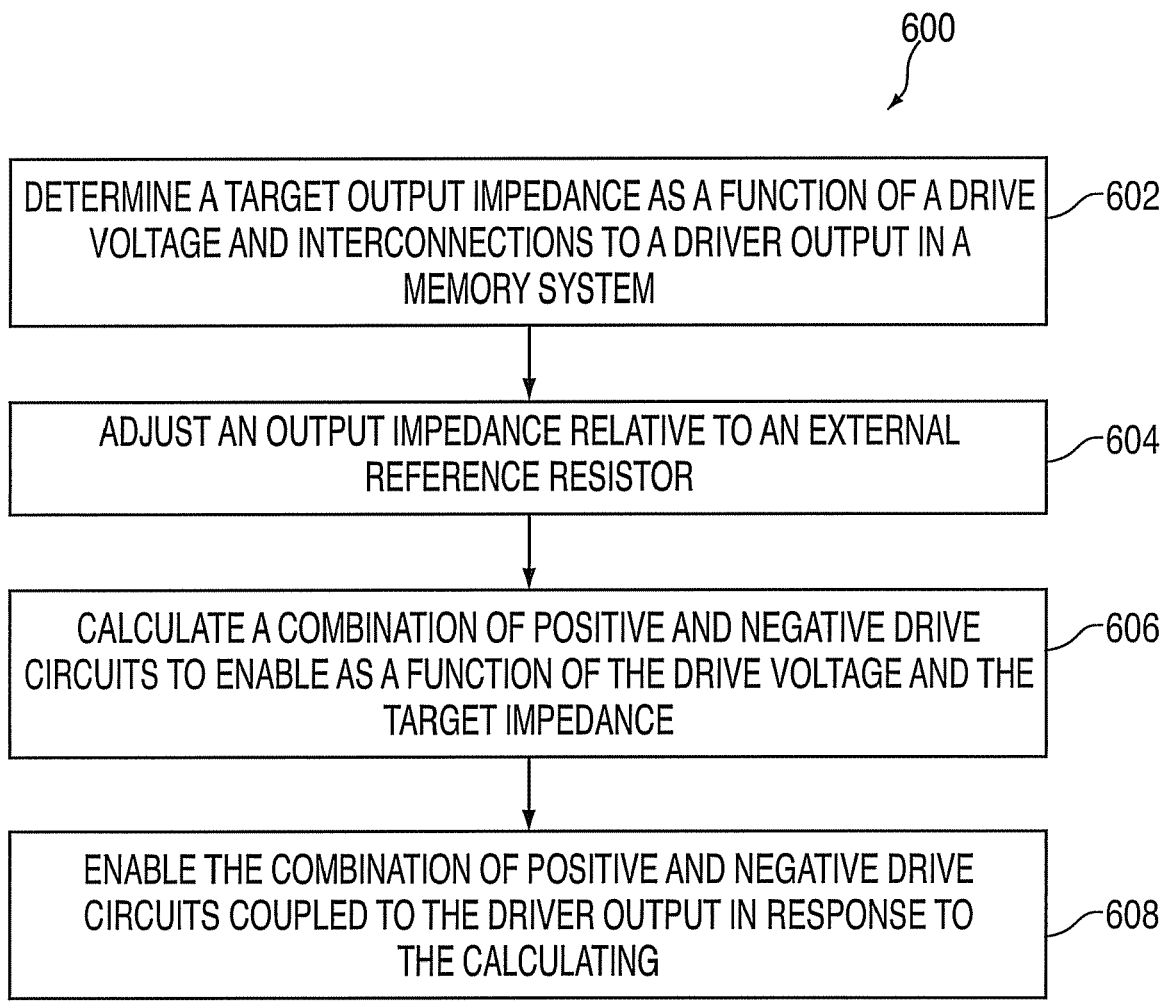
FIG. 6 depicts an exemplary process for controlling for variable impedance and voltage in a memory system that may be implemented by exemplary embodiments.

FIG. 6 depicts a process 600 for controlling for variable impedance and voltage in memory system 100 that may be implemented as described in reference to FIGS. 1-5. The memory system 100 can be configured in variety of architectures, e.g., planar or a cascade interconnected DIMMs. A memory interface device, such as the memory device hub 104 or the memory controller 110 can include one or more PHYs 126 to communicate with memory devices, e.g., DRAMs 509. In an exemplary embodiment, the PHYs 126 are configurable to support a variety of memory technologies, such as DDR2, DDR3, DDR3+, DDR4, etc.

At block 602, the impedance control logic 214 determines a target output impedance as a function of a drive voltage (DVDD 327) and interconnections to a driver output 410 in the memory system 100. The target output impedance can be determined by applying system configuration information, such as the number and types of devices coupled to the driver output 410, e.g., data lines for a single rank of DDR3 versus multiple ranks. Each connection type (data, strobe, and address/control) can have a range of potential output impedances. In an exemplary embodiment, the target impedance is initially set to the highest impedance supported for a given connection type and iteratively adjusted based on feedback from the calibration cell 300 using the mode controls 308. For example, the target impedance for data lines (DQ 248) may default to 40 Ohms, while the target impedance for address/control lines 256 can default to 35 Ohms.

At block 604, the impedance control logic 214 adjusts the output impedance relative to an external reference resistor (Rext 360) for calibration, which is a specific value for different connection types, such as Rt 202, Rd 204, and Rd 206. Adjustments are made using the mode controls 308 to vary impedance and consequently voltage at the comparator 358. The impedance control logic 214 monitors positive and negative values via counters YNCNTDWN 342 and YPCNTDWN 374 for adjustments to the mode controls 308. The output impedance can also be adjusted for slew rate control by lowering the output impedance to increase slew rate and increasing the output impedance to decrease slew rate.

At block 606, the impedance control logic 214 calculates a combination of positive and negative drive circuits in Pdrive and Ndrive of the driver circuitry 400 to enable as a function of the drive voltage (DVDD 327) and the target impedance. The individual P-FETs P1-P4 and N-FETs N1-N8 can be switched on and off independently as a function of input A 406 and vector enables PVTP 402 and PVTN 404. In an exemplary embodiment, the calculations trim the Pdrive prior to the Ndrive.

At block 608, the impedance control logic 214 enables the combination of positive and negative drive circuits in the Pdrive and Ndrive of the driver circuitry 400 in response to the calculating. Enabling a greater number of the positive and negative drive circuits may be performed as the drive voltage (DVDD 327) is reduced, e.g., lowered from 1.5 Volts to 1.2 Volts. The process 600 can be performed independently for data bidirectional driver 246, differential bidirectional driver 250 and address driver 254, with different optimal values for each. Moreover, individual adjustments can be made per connection, e.g. each line of DQ 248, for further optimization while leaving external resistors unchanged.

Figure 7:
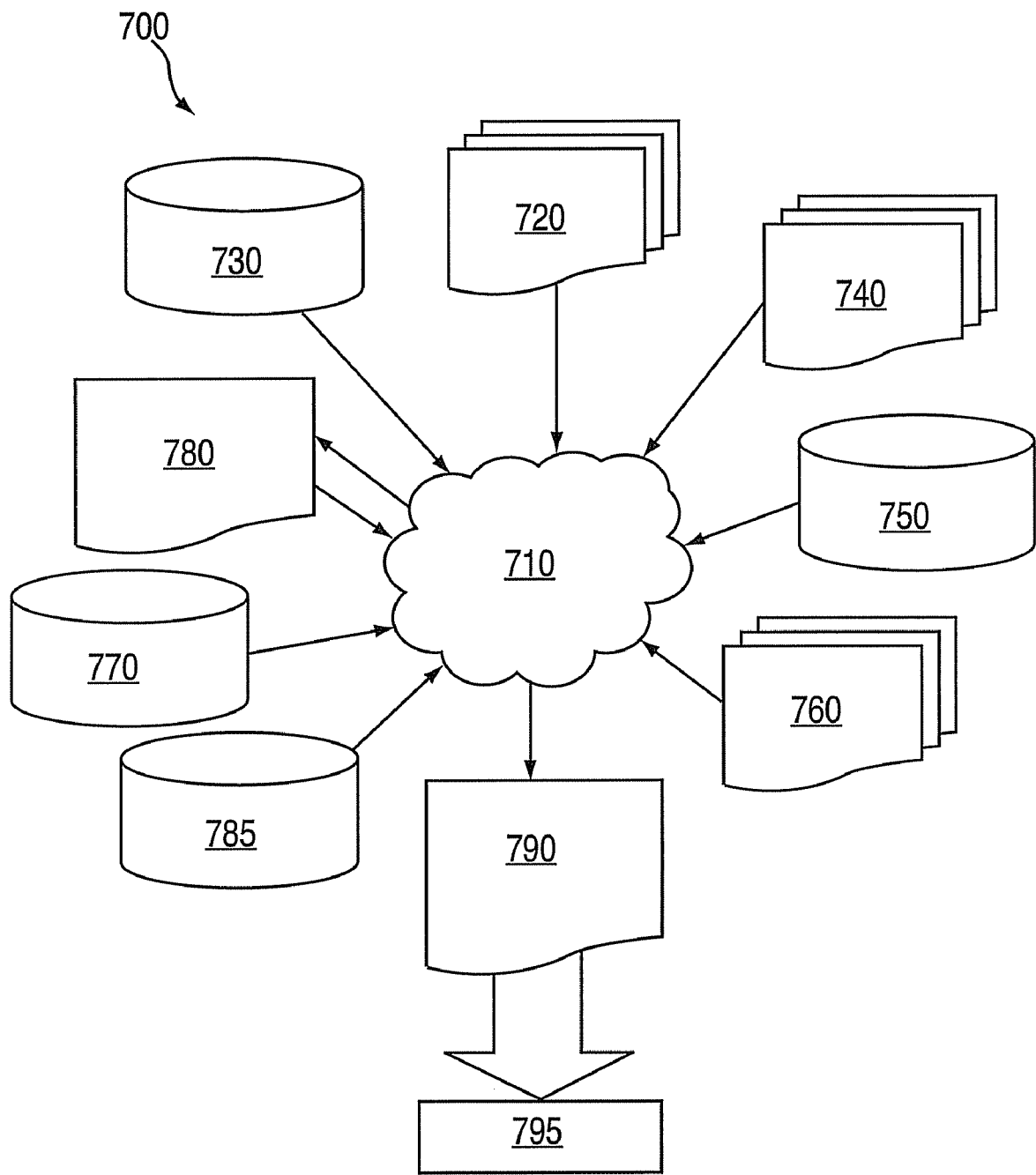
FIG. 7 is a flow diagram of a design process used in semiconductor design, manufacture, and/or test.

FIG. 7 shows a block diagram of an exemplary design flow 700 used for example, in semiconductor IC logic design, simulation, test, layout, and manufacture. Design flow 700 includes processes and mechanisms for processing design structures or devices to generate logically or otherwise functionally equivalent representations of the design structures and/or devices described above and shown in FIGS. 1-6. The design structures processed and/or generated by design flow 700 may be encoded on machine readable transmission or storage media to include data and/or instructions that when executed or otherwise processed on a data processing system generate a logically, structurally, mechanically, or otherwise functionally equivalent representation of hardware components, circuits, devices, or systems. Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown in FIGS. 1-6. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown in FIGS. 1-6 to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-6. In one embodiment, design structure 790 may comprise a compiled, executable HDL simulation model that functionally simulates the devices shown in FIGS. 1-6.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-6. Design structure 790 may then proceed to a stage 795 where, for example, design structure 790: proceeds to tape-out, is released to manufacturing, is released to a mask house, is sent to another design house, is sent back to the customer, etc.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Exemplary embodiments include a computing system with one or more processors and one or more I/O units (e.g., requesters) interconnected to a memory system that contains a memory controller and one or more memory devices. In exemplary embodiments, the memory system includes a processor or memory controller communicating with one or more hub devices (also referred to as "hub chips") which are attached to one or more ports or channels of the memory controller. The memory controller channels may be operated in parallel, thereby providing an increased data bus width and/or effective bandwidth, operated separately, or a combination therein as determined by the application and/or system design. The hub devices connect and interface to the memory devices either by direct connection (e.g. wires) or by way of one or more intermediate devices such as external buffers, registers, clocking devices, conversion devices, etc. In exemplary embodiments the computer memory system includes a physical memory array comprised of one or more volatile and/or non-volatile storage devices for storing such information as data and instructions. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or assembly that includes two or more hub devices that are cascaded interconnected to each other (and may further connect to another hub device located on another memory module) via the cascade interconnect, daisy chain and/or other memory bus structure.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device receives and generally translates and re-drives at least a portion of the received information in the memory access request(s) to the memory devices to initiate such operations as the storing of "write" data from the hub device or to provide "read" data to the hub device. Data read from the memory device(s) is generally encoded into one or more communication packet(s) and transmitted through the memory bus(es) to the memory controller or other requester—although the data may also be used by one or more of the hub devices (e.g. during memory "self-testing") or by another device having access to the hub, such as a service processor, test equipment, etc.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links (e.g. memory channels or ports) to connect to one or more hub chips and/or memory devices.

The memory modules may be implemented by a variety of technologies including a dual in-line memory module (DIMM), a single in-line memory module (SIMM), a triple in-line memory module (TRIMM), and quad in-line memory module (QUIMM), various "small" form-factor modules (such as small outline DIMMs (SO DIMMs), micro DIMMs, etc) and/or other memory module or card structures. In general, a DIMM refers to a circuit board which is often comprised primarily of random access memory (RAM) integrated circuits or die on one or both sides of the board, with signal and/or power contacts also on both sides, along one edge of the board that are generally have different functionality that the directly and/or diagonally opposed contacts. This can be contrasted to a SIMM which is similar is composition but having opposed contacts electrically interconnected and therefore providing the same functionality as each other. For TRIMMs and QUIMMs, at least one side of the board includes two rows on contacts, with other board types having contacts on multiple edges of the board (e.g. opposing and/or adjacent edges on the same side of the board), in areas away from the board edge, etc. Contemporary DIMMs includes 168, 184, 240, 276 and various other signal pin or pad counts, whereas past and future memory modules will generally include as few as tens of contacts to hundreds of contacts. In exemplary embodiments described herein, the memory modules may include one, two or more hub devices.

In exemplary embodiments, the memory bus is constructed using point-to-point connections between hub devices and/or a hub device and the memory controller, although other bus structures such as multi-drop busses may also be used. When separate "upstream" and "downstream" (generally unidirectional) busses are utilized (together comprising the memory "bus"), the "downstream" portion of the memory bus, referred to as the downstream bus, may include command, address, data and other operational, initialization or status information being sent to one or more of the hub devices that are downstream of the memory controller. The receiving hub device(s) may simply forward the information to the subsequent hub device(s) via bypass circuitry; receive, interpret and re-drive the information if it is determined by the hub(s) to be targeting a downstream hub device; re-drive some or all of the information without first interpreting the information to determine the intended recipient; or perform a subset or combination of these functions.

The upstream portion of the memory bus, referred to as the upstream bus, returns requested read data and/or error, status or other operational information, and this information may be forwarded to the subsequent hub devices and/or the memory control device(s) via bypass circuitry; be received, interpreted and re-driven if it is determined by the hub(s) to be targeting an upstream hub device and/or memory controller in the processor complex; be re-driven in part or in total without first interpreting the information to determine the intended recipient; or perform a subset or combination of these functions.

In alternate exemplary embodiments, the point-to-point bus includes a switch, re-drive or bypass mechanism which results in the bus information being directed to one of two or more possible hub devices during downstream communication (communication passing from the memory controller to a hub device on a memory module), and which may also direct upstream information (communication from a hub device on a memory module toward the memory controller), often by way of one or more upstream hub devices. Further embodiments include the use of continuity modules, such as those recognized in the art, which, for example, can be placed between the memory controller and a first populated memory module (e.g., a memory module that includes a hub device that is in communication with one or more memory devices), in a cascade interconnect memory system, such that any intermediate module positions between the memory controller and the first populated memory module includes a means by which information passing between the memory controller and the first populated memory module device can be received even if the one or more intermediate module position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device/module. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include conventional main memory storage devices such as one or more volatile memory device(s). In other exemplary embodiments, the continuity or re-drive function may be comprised as a hub device that is not placed on a memory module (e.g. the one or more hub device (s) may be attached directly to the system board or attached to another carrier), and may or may not include other devices connected to it to enable functionality.

In exemplary embodiments, the memory system includes one or more hub devices on one or more memory modules connected to the memory controller via one or more cascade interconnect memory buses, however one or more other bus structure(s) or a combination of bus structures may be implemented to enable communication such as point-to-point bus (es), multi-drop bus(es) or other shared or parallel bus(es), often allow various means of communication (e.g. including both high speed and low speed communication means). Depending on the signaling methods used, the intended operating frequency range, space, power, cost, and other constraints, various alternate bus structures may also be considered. A point-to-point bus may provide optimal performance (e.g. maximum data rate) in systems produced with high frequency signaling utilizing electrical interconnections, due to the reduced signal degradation that may occur as compared to bus structures having branched signal lines (such as "T" nets, multi-drop nets or other forms of "stubs". However, when used in systems requiring communication with a large number of devices and/or memory subsystems, this method will often result in significant added component cost, increased latency for distant devices and/or increased system power, and may further reduce the total memory density in a given volume of space due to the need for intermediate buffering and/or re-drive of the bus(es).

Although generally not shown in the Figures, the memory modules or hub devices may also include one or more separate bus(es), such as a "presence detect" (e.g. a module serial presence detect bus), an I2C bus, a JTAG bus, an SMBus or other bus(es) which are primarily used for one or more purposes such as the determination of the hub device and/or memory module attributes (generally after power-up), the configuration of the hub device(s) and/or memory subsystem (s) after power-up or during normal operation, bring-up and/ or training of the high speed interfaces (e.g. bus(es)), the reporting of fault or status information to the system and/or testing/monitoring circuitry, the determination of specific failing element(s) and/or implementation of bus repair actions such as bitlane and/or segment sparing, the determination of one or more failing devices (e.g. memory and/or support device(s)) possibly with the invoking of device replacement (e.g. device "sparing"), parallel monitoring of subsystem operation or other purposes, etc. The one or more described buses would generally not be intended for primary use as high speed memory communication bus(es). Depending on the bus characteristics, the one or more bus(es) might, in addition to previously described functions, also provide a means by which the valid completion of operations and/or failure identification could be reported by the hub devices and/or memory module(s) to the memory controller(s), the processor, a service processor, a test device and/or other functional element permanently or temporarily in communication with the memory subsystem and/or hub device.

In other exemplary embodiments, performances similar to those obtained from point-to-point bus structures can be obtained by adding switch devices to the one or more communication bus(es). These and other solutions may offer increased memory packaging density at lower power, while otherwise retaining many of the characteristics of a point-to-point bus. Multi-drop busses provide an alternate solution, albeit often limiting the maximum operating frequency to a frequency lower than that available with the use of an optimized point-to-point bus structure, but at a cost/performance point that may otherwise be acceptable for many applications. Optical bus solutions may permit significantly increased frequency and bandwidth vs. the previously-described bus structures, using point-to-point or multi-drop or related structures, but may incur cost and/or space impacts when using contemporary technologies.

As used herein the term "buffer" or "buffer device" refers to an interface device which includes temporary storage circuitry (such as when used in a computer), especially one that accepts information at one rate (e.g. a high data rate) and delivers it another (e.g. a lower data rate), and vice versa. Data rate multipliers of 2:1, 4:1, 5:1, 6:1, 8:1, etc. may be utilized in systems utilizing one or more buffer device(s) such as those described herein, with such systems often supporting multiple data rate multipliers—generally on a per-port basis. In exemplary embodiments, a buffer is an electronic device that provides compatibility between two signals (e.g. one or more of changing voltage levels, converting data rates, etc.). The term "hub" may be used interchangeably with the term "buffer" in some applications. A hub is generally described as a device containing multiple ports that enable connection to one or more devices on each port. A port is a portion of an interface that serves a congruent I/O functionality (e.g., in the exemplary embodiment, a port may be utilized for sending and receiving information such as data, address, command and control information over one of the point-to-point links (which may further be comprised of one or more bus(es)), thereby enabling communication with one or more memory devices. A hub may further be described as a device that connects several systems, subsystems, or networks together, and may include logic to merge local data into a communication data stream passing through the hub device. A passive hub may simply forward messages, while an active hub, or repeater, may amplify, re-synchronize and/or refresh a stream of data (e.g. data packets) which otherwise would deteriorate in signal quality over a distance. The term hub device, as used herein, refers primarily to one or more active devices that also include logic (including hardware and/or software) for directly and/or indirectly connecting to and communicating with one or more memory device(s) utilizing one communication means to another communication means (e.g. one or more of an upstream and downstream bus and/or other bus structure). The hub device may further include one or more traditional "memory controller" functions such as the conversion of high-level address and/or commands into technology-specific memory device information, scheduling and/or re-ordering of memory operations, the inclusion of local data caching circuitry and/or include other traditional memory controller and/or memory system functions.

Also as used herein, the term "bus" refers to one of the sets of conductors (e.g., wires, printed circuit board traces or other connection means) between devices, cards, modules and/or other functional units. The data bus, address bus and control signals, despite their names, generally constitute a single bus since each are often useless without the others. A bus may include a plurality of signal lines, each signal line having two or more connection points that form a transmission path that enables communication between two or more transceivers, transmitters and/or receivers. The term "channel", as used herein, refers to the one or more busses containing information such as data, address(es), command(s) and control(s) to be sent to and received from a system or subsystem, such as a memory, processor or I/O system. Note that this term is often used in conjunction with I/O or other peripheral equipment; however the term channel has also been utilized to describe the interface between a processor or memory controller and one of one or more memory subsystem(s).

Further, as used herein, the term "daisy chain" refers to a bus wiring structure in which, for example, device A is wired to device B, device B is wired to device C, etc . . . The last device is typically wired to a resistor or terminator. All devices may receive identical signals or, in contrast to a simple bus, each device may modify, re-drive or otherwise act upon one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. The terms daisy chain and cascade connect may be used interchangeably when a daisy chain structure includes some form of re-drive and/or "repeater" function. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors, optical carriers and/or other information transfer method, generally configured as a single carrier or as two or more carriers, in a twisted, parallel, or concentric arrangement, used to transport at least one logical signal.

Memory devices are generally defined as integrated circuits that are comprised primarily of memory (storage) cells, such as DRAMs (Dynamic Random Access Memories), SRAMs (Static Random Access Memories), FeRAMs (Ferro-Electric RAMs), MRAMs (Magnetic Random Access Memories), ORAMs (optical random access memories), Flash Memories and other forms of random access and/or pseudo random access storage devices that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs, QDR (Quad Data Rate) Synchronous DRAMs, Toggle-mode DRAMs or any of the expected follow-on devices such as DDR2, DDR3, DDR4 and related technologies such as Graphics RAMs, Video RAMs, LP RAMs (Low Power DRAMs) which are often based on at least a subset of the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package and/or or integrated onto a single device—based on technology, power, space, cost and other tradeoffs. In addition, one or more of the various passive devices such as resistors, capacitors may be integrated into the support chip packages and/or into the substrate, board or raw card itself, based on technology, power, space, cost and other tradeoffs. These packages may also include one or more heat sinks or other cooling enhancements, which may be further attached to the immediate carrier or be part of an integrated heat removal structure that contacts more than one support and/or memory devices.

Memory devices, hubs, buffers, registers, clock devices, passives and other memory support devices and/or components may be attached to the memory subsystem via various methods including solder interconnects, conductive adhesives, socket assemblies, pressure contacts and other methods which enable communication between the two or more devices and/or carriers via electrical, optical or alternate communication means.

The one or more memory modules, memory cards and/or alternate memory subsystem assemblies and/or hub devices may be electrically connected to the memory system, processor complex, computer system or other system environment via one or more methods such as soldered interconnects, connectors, pressure contacts, conductive adhesives, optical interconnects and other communication and power delivery methods. Inter-connection systems may include mating connectors (e.g. male/female connectors), conductive contacts and/or pins on one carrier mating with a compatible male or female connection means, optical connections, pressure contacts (often in conjunction with a retaining mechanism) and/or one or more of various other communication and power delivery methods. The interconnection(s) may be disposed along one or more edges of the memory assembly, may include one or more rows of interconnections and/or be located a distance from an edge of the memory subsystem depending on such application requirements as the connection structure, the number of interconnections required, performance requirements, ease of insertion/removal, reliability, available space/volume, heat transfer/cooling, component size and shape and other related physical, electrical, optical, visual/physical access, etc. Electrical interconnections on contemporary memory modules are often referred to as contacts, pins, tabs, etc. Electrical interconnections on a contemporary electrical connector are often referred to as contacts, pads, pins, pads, etc.

As used herein, the term memory subsystem refers to, but is not limited to one or more memory devices, one or more memory devices and associated interface and/or timing/control circuitry and/or one or more memory devices in conjunction with a memory buffer, hub device, and/or switch. The term memory subsystem may also refer to a storage function within a memory system, comprised of one or more memory devices in addition to one or more supporting interface devices and/or timing/control circuitry and/or one or more memory buffers, hub devices or switches, identification devices, etc.; generally assembled onto one or more substrate(s), card(s), module(s) or other carrier type(s), which may further include additional means for attaching other devices. The memory modules described herein may also be referred to as memory subsystems because they include one or more memory devices and other supporting device(s).

Additional functions that may reside local to the memory subsystem and/or hub device include write and/or read buffers, one or more levels of local memory cache, local pre-fetch logic (allowing for self-initiated pre-fetching of data), data encryption/decryption, compression/de-compression, address and/or command protocol translation, command prioritization logic, voltage and/or level translation, error detection and/or correction circuitry on one or more busses, data scrubbing, local power management circuitry (which may further include status reporting), operational and/or status registers, initialization circuitry, self-test circuitry (testing logic and/or memory in the subsystem), performance monitoring and/or control, one or more co-processors, search engine(s) and other functions that may have previously resided in the processor, memory controller or elsewhere in the memory system. Memory controller functions may also be included in the memory subsystem such that one or more of non-technology-specific commands/command sequences, controls, address information and/or timing relationships can be passed to and from the memory subsystem, with the subsystem completing the conversion, re-ordering, re-timing between the non-memory technology-specific information and the memory technology-specific communication means as necessary. By placing more technology-specific functionality local to the memory subsystem, such benefits as improved performance, increased design flexibility/extendibility, etc., may be obtained, often while making use of unused circuits within the subsystem.

Memory subsystem support device(s) may be directly attached to the same substrate or assembly onto which the memory device(s) are attached, or may be mounted to a separate interposer, substrate, card or other carrier produced using one or more of various plastic, silicon, ceramic or other materials which include electrical, optical or other communication paths to functionally interconnect the support device(s) to the memory device(s) and/or to other elements of the memory subsystem or memory system.

Information transfers (e.g. packets) along a bus, channel, link or other interconnection means may be completed using one or more of many signaling options. These signaling options may include one or more of such means as single-ended, differential, optical or other communication methods, with electrical signaling further including such methods as voltage and/or current signaling using either single or multi-level approaches. Signals may also be modulated using such methods as time or frequency, non-return to zero, phase shift keying, amplitude modulation and others. Signal voltage levels are expected to continue to decrease, with 1.5V, 1.2V, 1V and lower signal voltages expected, as a means of reducing power, accommodating reduced technology breakdown voltages, etc.—in conjunction with or separate from the power supply voltages. One or more power supply voltages, e.g. for DRAM memory devices, may drop at a slower rate that the I/O voltage(s) due in part to the technological challenges of storing information in the dynamic memory cells.

One or more clocking methods may be utilized within the memory subsystem and the memory system itself, including global clocking, source-synchronous clocking, encoded clocking or combinations of these and other methods. The clock signaling may be identical to that of the signal (often referred to as the bus "data") lines themselves, or may utilize one of the listed or alternate methods that is more conducive to the planned clock frequency(ies), and the number of clocks required for various operations within the memory system/subsystem(s). A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the memory subsystem and/or may be based on a clock that is derived from the clock included as part of the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and/or other functional, configuration or related operations. Information passing from the memory subsystem(s) may include any or all of the information passing to the memory subsystem(s), however generally will not include address and command information. The information passing to or from the memory subsystem(s) may be delivered in a manner that is consistent with normal memory device interface specifications (generally parallel in nature); however, all or a portion of the information may be encoded into a 'packet' structure, which may further be consistent with future memory interfaces or delivered using an alternate method to achieve such goals as an increase communication bandwidth, an increase in memory subsystem reliability, a reduction in power and/or to enable the memory subsystem to operate independently of the memory technology. In the latter case, the memory subsystem (e.g. the hub device) would convert and/or schedule, time, etc. the received information into the format required by the receiving device (s).

Initialization of the memory subsystem may be completed via one or more methods, based on the available interface busses, the desired initialization speed, available space, cost/complexity, the subsystem interconnect structures involved, the use of alternate processors (such as a service processor) which may be used for this and other purposes, etc. In one embodiment, the high speed bus may be used to complete the initialization of the memory subsystem(s), generally by first completing a step-by-step training process to establish reliable communication to one, more or all of the memory subsystems, then by interrogation of the attribute or 'presence detect' data associated the one or more various memory assemblies and/or characteristics associated with any given subsystem, and ultimately by programming any/all of the programmable devices within the one or more memory subsystems with operational information establishing the intended operational characteristics for each subsystem within that system. In a cascaded system, communication with the memory subsystem closest to the memory controller would generally be established first, followed by the establishment of reliable communication with subsequent (downstream) subsystems in a sequence consistent with their relative position along the cascade interconnect bus.

A second initialization method would include one in which the high speed bus is operated at one frequency during the initialization process, then at a second (and generally higher) frequency during the normal operation. In this embodiment, it may be possible to initiate communication with any or all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic and/or other methods such as a power-on-rest detection via detection of a slow command identifying that function.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also provides an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) may facilitate increased function on integrated devices as well as the integration of functions previously implemented on separate devices. This integration can serve to improve overall performance of the memory system and/or subsystem(s), as well as provide such system benefits as increased storage density, reduced power, reduced space requirements, lower cost, higher performance and other manufacturer and/or customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths and/or portions of such paths (e.g. "segments" of end-to-end "bitlanes") between a given memory subsystem and the memory controller to replace failing paths and/or portions of paths, complement-re-complement techniques and/or alternate reliability enhancement methods as used in computer, communication and related systems.

The use of bus termination, on busses ranging from point-to-point links to complex multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage (such voltage directly sourced to the device(s) or indirectly sourced to the device(s) from a voltage divider, regulator or other means), or another signal. The termination device(s) may be part of a passive or active termination structure, and may reside in one or more positions along one or more of the signal lines, and/or as part of the transmitter and/or receiving device(s). The terminator may be selected to match the impedance of the transmission line, be selected as an alternate impedance to maximize the useable frequency, signal swings, data widths, reduce reflections and/or otherwise improve operating margins within the desired cost, space, power and other system/subsystem limits.

Technical effects include a memory interface device capable of interfacing with a variety of memory devices on a DIMM and/or with registers on RDIMMs providing support for variable impedances and voltages in a memory system of a computer system. The memory interface is configurable to establish different output impedances for data lines, address lines, and data strobe lines. The memory interface device also controls slew rate and supports multiple voltage levels without requiring a change to external calibration resistors. Thus, the memory interface device provides an upgrade path that is software or firmware configurable to handle future lower-voltage memory devices as well as different loads within the same memory system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A memory interface device comprising:
   a calibration cell configurable to adjust an output impedance relative to an external reference resistor;
   driver circuitry comprising multiple positive drive circuits and multiple negative drive circuits coupled to a driver output in a memory system;
   impedance control logic to adjust the output impedance of the calibration cell and selectively enable the positive and negative drive circuits as a function of a drive voltage and a target impedance; and
   a plurality of the calibration cells including a terminator calibration cell, a data calibration cell, and an address cell, wherein the plurality of the calibration cells are individually configurable.

2. The memory interface device of claim 1 wherein adjustments to the terminator calibration cell produce the output impedance in a range comprising between 30, 40, 60, and 120 Ohms with a 10% tolerance; further wherein adjustments to the data calibration cell produce the output impedance in a range comprising between 25, 30, 35, and 40 Ohms with a 10% tolerance; and further wherein adjustments to the address calibration cell produce the output impedance in a range comprising between 15, 20, 30, and 35 Ohms with a 10% tolerance.

3. The memory interface device of claim 1 further comprising a plurality of the driver circuitry including a data bidirectional driver, a differential bidirectional driver, and an address driver.

4. The memory interface device of claim 3 wherein the data bidirectional driver drives data at a rate 800 and 1600 Megabits per second.

5. The memory interface device of claim 3 wherein a first impedance control logic block controls multiple data bidirectional drivers, a second impedance control logic block controls multiple differential bidirectional drivers, and a third impedance control logic block controls multiple address drivers.

6. The memory interface device of claim 1 wherein supported voltages for the drive voltage comprise 1.2 Volts, 1.35 Volts, and 1.5 Volts within a tolerance of 10%.

7. The memory interface device of claim 1 wherein the calibration cell comprises switches, comparators, configurable voltage dividers, and bit latches to adjust positive and negative count values to the impedance control logic for adjusting the output impedance.

8. The memory interface device of claim 1 wherein the positive drive circuits are further comprised of p-channel field effect transistors (P-FETs) coupled to a drive voltage source and resistors to the driver output as enabled by a combination of a positive enable and an input value to drive, and further wherein the negative drive circuits are further comprised of n-channel field effect transistors (N-FETs) coupled to a ground and the resistors to the driver output as enabled by a combination of a negative enable and the input value to drive.

9. The memory interface device of claim 1 wherein the memory interface device is one of a memory hub device and a memory controller.

10. A system comprising:
    one or more memory devices; and
    a memory interface device in communication with the one or more memory devices via a physical interface, wherein the physical interface comprises:
    a calibration cell configurable to adjust an output impedance relative to an external reference resistor;

driver circuitry comprising multiple positive drive circuits and multiple negative drive circuits coupled to a driver output in the system; and impedance control logic to adjust the output impedance of the calibration cell and selectively enable the positive and negative drive circuits as a function of a drive voltage and a target impedance;

a plurality of the calibration cells including a terminator calibration cell, a data calibration cell, and an address cell, wherein the plurality of the calibration cells are individually configurable; and a plurality of the driver circuitry including a data bidirectional driver, a differential bidirectional driver, and an address driver, wherein the data bidirectional driver drives data at a rate 800 and 1600 Megabits per second, and supported voltages for the drive voltage comprise 1.2 Volts, 1.35 Volts, and 1.5 Volts within a tolerance of 10%.

11. The system of claim 10 wherein the memory interface device further comprises multiple ports and each port includes the physical interface.

12. The system of claim 10 wherein the one or more memory devices are in communication with the memory interface device via one or more of:

a registered dual in-line memory module; and a connection on a memory module.

13. The memory hub device of claim 10 wherein adjustments to the terminator calibration cell produce the output impedance in a range comprising between 30, 40, 60, and 120 Ohms with a 10% tolerance; further wherein adjustments to the data calibration cell produce the output impedance in a range comprising between 25, 30, 35, and 40 Ohms with a 10% tolerance; and further wherein adjustments to the address calibration cell produce the output impedance in a range comprising between 15, 20, 30, and 35 Ohms with a 10% tolerance.

14. A method for controlling for variable impedance and voltage in a memory system, the method comprising:

determining a target output impedance as a function of a drive voltage and interconnections to a driver output in the memory system;

adjusting an output impedance relative to an external reference resistor;

calculating a combination of positive and negative drive circuits to enable as a function of the drive voltage and the target impedance;

enabling the combination of positive and negative drive circuits coupled to the driver output in response to the calculating; and wherein the output impedance is adjusted to a highest value and reduced iteratively via mode controls as a function of feedback from a calibration cell with a selectable reference circuit coupled to the external reference resistor.

15. The method of claim 14 wherein the output impedance is lowered to increase slew rate and the output impedance is increased to reduce the slew rate.

16. The method of claim 14 further comprising:

enabling a greater number of the positive and negative drive circuits as the drive voltage is reduced.

17. The method of claim 14 wherein the method is performed independently for a data bidirectional driver, a differential bidirectional driver and an address driver.

* * * * *